(12) United States Patent
Shinners et al.

(10) Patent No.: US 11,589,510 B2
(45) Date of Patent: Feb. 28, 2023

(54) RESIDUE MONITORING

(71) Applicant: Wisconsin Alumni Research Foundation, Madison, WI (US)

(72) Inventors: Kevin Shinners, Madison, WI (US); Cyrus Nigon, Waunakee, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 346 days.

(21) Appl. No.: 16/546,629

(22) Filed: Aug. 21, 2019

(65) Prior Publication Data

US 2020/0060082 A1 Feb. 27, 2020

Related U.S. Application Data

(60) Provisional application No. 62/721,040, filed on Aug. 22, 2018.

(51) Int. Cl.
| | |
|---|---|
| *A01D 41/127* | (2006.01) |
| *A01D 41/06* | (2006.01) |
| *A01F 29/04* | (2006.01) |
| *A01D 45/02* | (2006.01) |
| *A01D 45/30* | (2006.01) |

(52) U.S. Cl.
CPC ......... *A01D 41/1271* (2013.01); *A01D 41/06* (2013.01); *A01F 29/04* (2013.01); *A01D 45/021* (2013.01); *A01D 45/30* (2013.01)

(58) Field of Classification Search
CPC .. A01D 41/1271; A01D 41/06; A01D 45/021; A01D 45/30; A01F 29/04; A01F 12/40; A01B 17/002; A01B 33/16; A01B 41/06; A01B 63/28; A01B 79/00

See application file for complete search history.

(56) References Cited

U.S. PATENT DOCUMENTS

| | | | |
|---|---|---|---|
| 6,282,967 B1 | 9/2001 | Homburg | |
| 6,783,454 B2 * | 8/2004 | Bueermann | A01F 12/40 460/112 |
| 7,485,035 B1 | 2/2009 | Yde | |
| 7,648,413 B2 * | 1/2010 | Duquesne | A01D 41/127 460/112 |
| 8,010,262 B2 * | 8/2011 | Schroeder | A01D 41/1243 701/50 |
| 8,092,286 B2 * | 1/2012 | Farley | A01F 12/40 460/112 |

(Continued)

FOREIGN PATENT DOCUMENTS

EP 1964461 A1 9/2008

OTHER PUBLICATIONS

Allmaras, R., et al, 1985. Distribution of small grain residue produced by combines. Agron. J., vol. 77, pp. 730-734.

(Continued)

*Primary Examiner* — Arpad Fabian-Kovacs
(74) *Attorney, Agent, or Firm* — Quarles & Brady LLP (57) ABSTRACT

A residue management system or method can be implemented for an agricultural harvester that includes a residue processing system. A sensor arrangement can be in communication with one or more components of the residue processing system. The sensor arrangement can be configured to measure indicators of a mass flow rate of the crop residue through the crop residue system across a width of a stream of the crop residue.

20 Claims, 9 Drawing Sheets

(56) References Cited

U.S. PATENT DOCUMENTS

| | | | |
|---|---|---|---|
| 8,177,610 B2 | 5/2012 | Birrell et al. | |
| 9,137,949 B2* | 9/2015 | Isaac | A01F 12/40 |
| 9,497,903 B2 | 11/2016 | Biggerstaff | |
| 9,714,856 B2 | 7/2017 | Myers | |
| 9,763,384 B2 | 9/2017 | Hessler | |
| 10,905,045 B2* | 2/2021 | Garrett | A01D 41/1271 |
| 2002/0091476 A1* | 7/2002 | Beck | A01D 41/1271 |
| | | | 701/50 |
| 2003/0190939 A1* | 10/2003 | Bueermann | A01F 12/40 |
| | | | 460/111 |
| 2004/0168528 A1 | 9/2004 | Heinrich et al. | |
| 2008/0248843 A1* | 10/2008 | Birrell | A01B 79/005 |
| | | | 460/112 |
| 2011/0093169 A1* | 4/2011 | Schroeder | A01D 41/1243 |
| | | | 701/50 |
| 2012/0245802 A1 | 9/2012 | Schlesser | |
| 2014/0171160 A1 | 6/2014 | Ricketts et al. | |
| 2015/0038201 A1* | 2/2015 | Brinkmann | A01F 12/40 |
| | | | 460/112 |
| 2016/0044869 A1* | 2/2016 | Mayerle | A01F 12/58 |
| | | | 460/1 |
| 2016/0088794 A1* | 3/2016 | Baumgarten | A01F 12/40 |
| | | | 460/1 |
| 2016/0150727 A1* | 6/2016 | Mayerle | A01F 12/10 |
| | | | 460/112 |
| 2017/0055445 A1* | 3/2017 | Mahieu | A01F 12/40 |
| 2017/0311543 A1 | 11/2017 | Leenknegt | |
| 2018/0303030 A1* | 10/2018 | Heitmann | A01D 41/127 |
| 2018/0368319 A1* | 12/2018 | Desmet | A01D 41/1243 |
| 2019/0104681 A1* | 4/2019 | Larson | A01F 12/18 |
| 2020/0305352 A1* | 10/2020 | Bussmann | A01F 7/067 |
| 2021/0022289 A1* | 1/2021 | Berry | B02C 13/1835 |

OTHER PUBLICATIONS

Bal, M. A. et al., 2000. Crop processing and chop length of corn silage: Effects on intake, digestion, and milk production by dairy cows. J. Dairy Sci., 83(6), pp. 1264-1273.

Capper, B. S., et al., 1992. Influence of variety, row type and time of sowing on the morphology, chemical composition and in vitro digestibility of barley straw. J. Agric. Sci., pp. 165-173.

Carter, M. R., 1994. A review of conservation tillage strategies for humid temperate regions. Soil Till. Res., vol. 31, pp. 289-301.

Chen, Y., et al., 2003. Drill and crop performances as affected by different drill configurations for no-till seeding. Soil Till. Res., vol. 77, pp. 147-155.

Deere & Company, 2013. Attachments, STS fine-cut straw chopper. [Online] Available at: http://salesmanual.deere.com/sales/salesmanual/en_NA/combines_headers/attachments/combines/residue_disposal/wide_sprd_fine_cut_chopper_sts.html. Last updated on Nov. 9, 2018.

Derpsch, R., et al., 2010. Current status of adoption of no-till farming in the world and some of its main benefits. Int. J. Agric. & Biol. Eng., March, 3(1), pp. 1-26.

Douglas, C. L., et al., 1989. Cutting height, yield, level, and equipment modification effects on residue distribution by combines. Trans. ASAE, pp. 1258-1262.

Gale, G. E. et al., 1982. An apparatus for the assessment of the length distribution of chopped forage. J. Agric. Eng. Res., vol. 27, pp. 35-43.

Giacomini, S. J., et al., 2007. Simulating the effects of N availability, straw particle size and location in soil on C and N mineralization. Plant Soil, pp. 289-301.

Hanigan, M. "Volumetric yield sensing in a combine harvester." (2018). Thesis. Iowa State University.

Hardzinski, J. E., Oscillating screen particle separator for length-of-cut analysis of alfalfa. University of Wisconsin-Madison, 1981.

Henriksen, T. M. et al., 2002. Carbon mineralization, fungal and bacterial growth, and enzyme activities as affected by contact between crop residues and soil. Biol Fertil Soils, pp. 41-48.

Hobbs, P. R., 2007. Conservation agriculture: What is it and why is it important for future sustainable food production?. J. Agric. Sci., April. pp. 127-137.

Julrat, S. et al., 2017. Portable six-port reflectometer for determining moisture content of biomass material. IEEE Sensors J., pp. 4814-4819.

Keene, J. R. et al., 2013. Single-pass baling of corn stover. Trans. ASABE, 56(1), pp. 33-40.

Leonardi, C., et al., 2005. Effect of different dietary geometric mean particle length and particle size distribution of bat silage on feeding behavior and productive performance of dairy cattle. J. Dairy Sci., 88(2), pp. 698-710.

Morris, N. L., et al., 2010. The adoption of non-inversion tillage systems in the United Kingdom and the agronomic impact on soil, crops and the environment—A review. Soil & Tillage Res., vol. 108, pp. 1-15.

Needham, P., 2008. Conference Handouts. Chop It, Distribute It and Do It Evenly. [Online] Available at: http://www.needhamag.com/conference_handouts/residue_management.php.

Nelson, S. O., et al., 2016. Microwave sensing of moisture content and bulk density in flowing grain and seed. Trans. ASABE, 59(2), pp. 429-433.

Önal, I., 2010. Quality criteria of stubble cultivation and drilling on the conservation tillage systems. Tarim Makinalari Bilimi Dergisi, 6(2), pp. 93-100.

Reyns, P., et al., 2002. A review of combine sensors for precision farming. Precision Agriculture, 3(2), pp. 169-182.

Ruan, H., et al., 2001. Residue cover and surface-sealing effects on infiltration: Numerical simulations for field applications. Soil Sci. Soc. Am. J., vol. 65, pp. 853-861.

Savoie, P. et al., 1989. Forage chopping energy vs. length of cut. Trans. ASAE, 32(2), pp. 437-0442.

Savoie, P., et al., 2014. Chopped forage particle size analysis in one, two, and three dimensions. Trans. ASABE, 57 (6), pp. 1549-1555.

Trabelsi, S. et al., 2004. Calibration methods for nondestructive microwave sensing of moisture content and bulk density of granular materials. Trans. ASABE, 47(6), pp. 1999-2008.

Travis, A. J. et al., 1996. Comparison of the anatomy and degradability of straw from varieties of wheat and barley that differ in susceptibility to lodging. J. Agric. Sci., pp. 1-10.

Triplett, G. B. et al., 2008. No-tillage crop production: a revolution in agriculture!. Agron. J., vol. 100, pp. S-153-S-165.

Yang, Y., 2007. Image and sieve analysis of biomass particle sizes and separation after size reduction. s.l.:s.n.

Savoie, P. et al., "Length distribution and other dimensional parameters of chopped forage by image analysis." Transactions of the ASABE 57.6 (2014): 1549-1555.

* cited by examiner

RESIDUE MONITORING

CROSS-REFERENCE TO RELATED APPLICATIONS

This application claims priority to U.S. Provisional Patent Application No. 62/721,040, titled "Residue Monitoring" and filed on Aug. 22, 2018, the entirety of which is incorporated herein by reference.

BACKGROUND

Demand for greater productivity during agricultural harvesting has resulted in relatively wide headers for agricultural harvesters ("harvesters"), including with regard to grain platforms and corn headers. As a result, relatively large amounts of crop are concentrated for processing within the harvesters, with a corresponding concentration of crop residue (sometimes referred to as material other than grain or "MOG").

For various reasons, it may be useful to distribute crop residue relatively evenly over a field during harvesting. For example, appropriate residue management can assist in maintaining soil productivity through nutrient return and prevention of erosion. However, the relatively wide area over which crops may be harvested in a single pass may present challenges to appropriately uniform distribution of crop residue from harvesters back to a field. This may be particularly true, in some applications, where crop residue of relatively large characteristic sizes are desired.

SUMMARY

Some embodiments of the invention provide a residue management system for an agricultural harvester that includes a chopper with a knife assembly for reducing size of crop residue. A sensor arrangement can be in communication with one or more components of the chopper. The sensor arrangement can be configured to measure indicators of a mass flow rate of the crop residue through the chopper across a width of a stream of the crop residue, based on measuring forces of the crop residue on the knife assembly.

Some embodiments of the invention provide an agricultural harvester that includes a header configured to harvest crop material, a residue processing system configured to process crop residue separated from the harvested crop material, and a residue management system. The residue management system can include a sensor arrangement in communication with one or more components of the residue processing system. The sensor arrangement can be configured to measure indicators of a mass flow rate of the crop residue through the residue processing system, and can include a plurality of sensors distributed across a width of the residue processing system to measure indicators of the mass flow rate at different locations across the width of the residue processing system.

Some embodiments of the invention provide a method of managing crop residue for an agricultural harvester using one or more processor devices. Using a sensor arrangement, indicators of a mass flow rate of the crop residue through a chopper can be measured. Based upon the indicators of the mass flow rate, one or more of a distribution of the crop residue within the chopper or a total mass flow rate of the crop residue through the chopper can be determined.

DETAILED DESCRIPTION

The following discussion is presented to enable a person skilled in the art to make and use embodiments of the invention. Various modifications to the illustrated embodiments will be readily apparent to those skilled in the art, and generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

Embodiments of the invention can be implemented as systems and/or methods, including computer-implemented methods. Some embodiments of the invention can include (or utilize) a device such as a special purpose or general purpose computer including various computer hardware, software, firmware, and so on, consistent with the discussion below.

In some implementations, aspects of the invention, including computerized implementations of methods according to the invention, can be implemented as a system, method, apparatus, or article of manufacture using standard programming and/or engineering techniques to produce software, firmware, hardware, or any combination thereof to control a computer or processor based device to implement aspects detailed herein. Unless otherwise specified or limited, the term "article of manufacture" as used herein is intended to encompass a computer program accessible from any computer-readable device, carrier (e.g., non-transitory signals), or media (e.g., non-transitory media). Computer-readable media can include, for example, magnetic storage devices (e.g., hard disk, floppy disk, magnetic strips, and so on), optical disks (e.g., compact disk (CD), digital versatile disk (DVD), and so on), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

In the context of computerized implementation of embodiments of the invention, as used herein, unless otherwise specified or limited, the terms "component," "system," "module," and the like are intended to refer to aspects of computer-related system that may include hardware, software, a combination of hardware and software, or software in execution. For example, a component or module of a computerized implementation may be a processor device, a process running on a processor device, a programming object, an executable, a thread of execution, a program, and/or a computer. By way of illustration, for example, both an application running on a computer and the computer itself can be a component or a module. In some implementations, one or more components, systems, or modules may reside within a process and/or thread of execution, may be localized on one computer, may be distributed between two or more computers or processors, and/or may be included within another component, system, or module.

Some embodiments of the invention may include methods with multiple operations. Unless otherwise specified or limited (e.g., unless inherently necessary), orders of operations presented herein for particular embodiments are intended as examples only.

As noted above, it may be useful to distribute crop residue from harvesters with appropriate uniformity. Some conventional approaches to residue management can allow operating parameters of harvesters to be closely controlled, including during active operation of the harvesters. For example, operators can adjust residue distribution systems to account for environmental factors such as wind speed and direction, sloping of terrain, and so on. However, conventional systems may lack accurate information regarding the actual distribution of crop residue within the relevant harvester, as might usefully guide system adjustments. Among other benefits, embodiments of the invention can usefully execute monitoring and other tasks to address this issue In some embodiments, for example, systems or methods according to the invention can usefully determine spatial distribution of crop residue (e.g., left-to-right distribution) within a relevant harvester. This spatial distribution, as appropriate, can then be utilized to more effectively monitor and control dispersal of residue from a harvester to a field. Thus, for example, embodiments of the invention can help to support improved spatial distribution of crop residue on a field and thereby help to ensure appropriately uniform cover and protection of the soil surface.

Consistent with the discussion above, embodiments of the invention can include a sensor arrangement that is configured to measure indicators of crop-residue mass flow within a harvester. For example, one or more load, torque, or strain sensors can be disposed in communication with a component (e.g., a size-reduction chopper) of a residue processing system of a harvester, in order to measure loads, torque, or strain as indicators of mass flow rate of crop residue through the chopper. Based upon the measured indicators, a processor device can then determine a lateral distribution of crop residue within the residue management system, a bulk or local mass flow rate of crop residue within the chopper, or other related measurements.

Figure 1:
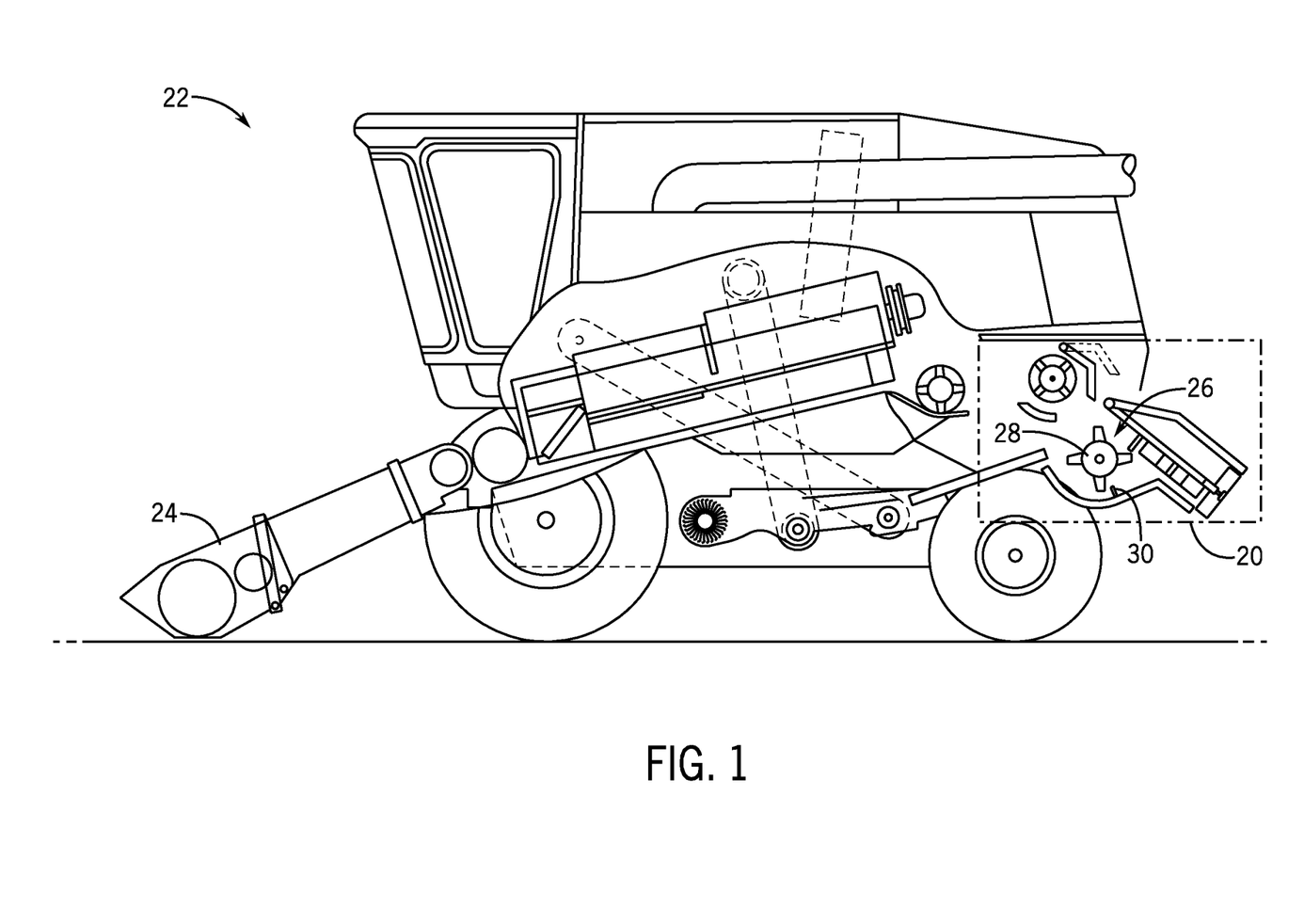
FIG. 1 is a schematic view of a residue management system installed in a combine harvester according to an embodiment of the invention.

Different embodiments of the invention can be implemented with regard to different types of harvesters. For example, FIG. 1 illustrates a crop residue management system 20 installed for use with a combine harvester 22 according to an embodiment of the invention. Generally, a header 24 of the combine harvester 22 can harvest crop material from a field and direct the crop material into the body of the combine harvester 22 for processing. As a result, the crop material can be separated into a retained fraction (e.g., grain) and crop residue (e.g., MOG). The crop residue is directed by internal machinery of the combine harvester 22 to a residue management system that includes a chopper 26, which is generally configured to cut the crop residue into pieces of an appropriate size distribution.

Using any of a variety of sensors, such as load sensors, torque sensors, strain sensors, impact sensors and so on, the crop residue management system 20 can measure indicators of the mass flow rate of the crop residue that passes through the chopper 26. Usefully, in some embodiments, the crop residue management system 20 can measure indicators of the mass flow rate of crop residue at multiple discrete or continuous points across a width (e.g., a full width) of the crop residue flow stream. In this way, for example, the distribution of crop residue across a relevant area may be determined and, as appropriate, adjustments made to other residue distribution systems.

Figure 2:
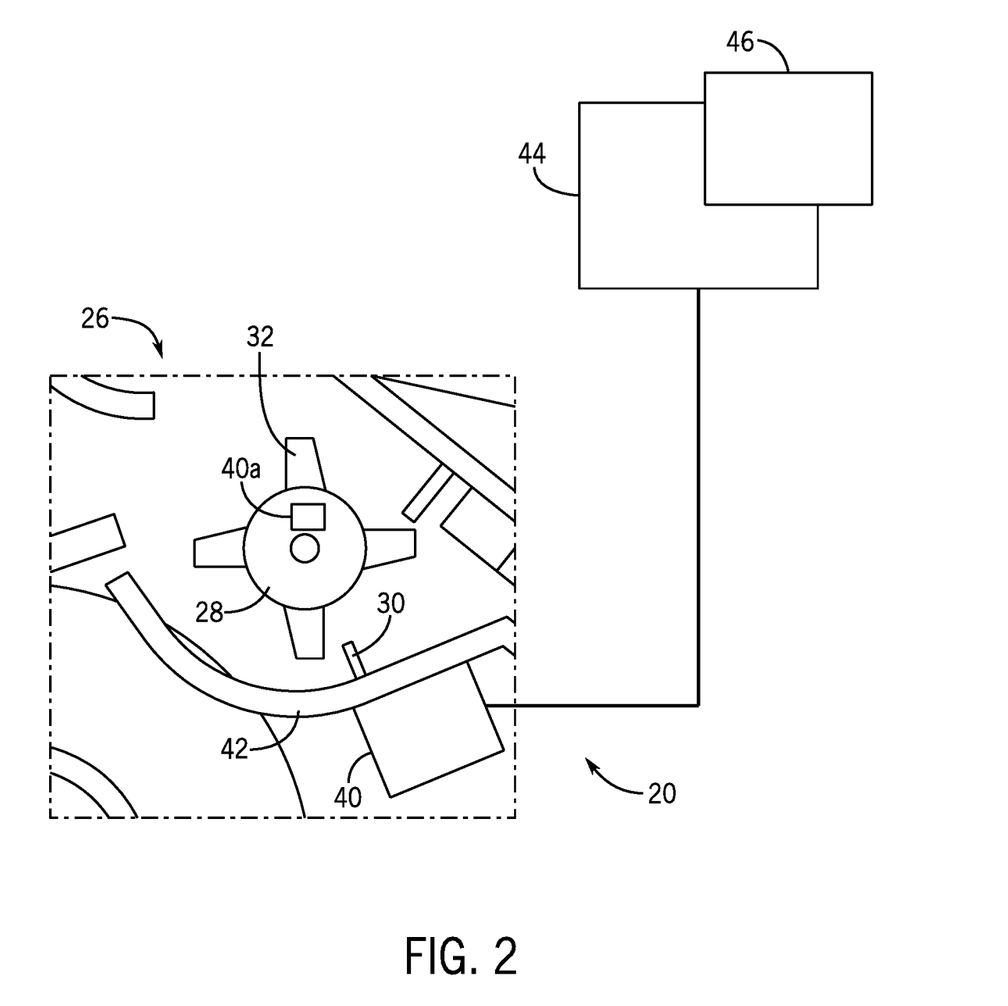
FIG. 2 is a schematic partial view of the residue management system and a size-reduction chopper of the combine of FIG. 1.

In different embodiments, choppers and other components of crop residue management systems can be configured in a variety of ways. In the combine harvester 22, as also illustrated in FIG. 2, the chopper 26 is configured as a rotary flail chopper, with a rotating knife assembly 28 that is configured as a chopper rotor with a rotating array of knives 32. Correspondingly, a stationary knife assembly 30 is configured as a stationary bank of knives that are interleaved with the knives of the chopper rotor. Rotation of the knives 32 of the chopper rotor past the knives of the stationary knife assembly 30 can accordingly cause crop residue to be cut (e.g., sliced, shattered, bent, broken, and so on) to appropriate sizes. Further, the movement of the chopper rotor, or other components, can propel the crop residue rearward, to be dispersed from a residue distribution system of the combine harvester 22 onto a field.

In some configurations, the stationary knife assembly 30 can be withdrawn from the crop residue stream, as may be appropriate for crops such as corn, or in other contexts. In some configurations, the stationary knife assembly 30 can be adjusted to any number of positions relative to the rotating knife assembly 28 or other components. For example, the stationary knife assembly 30 can be adjusted to extend into the path of the knives 32 of the rotating knife assembly 28 to any desired degree between maximum-extension and minimum-extension positions.

Certain details of the crop residue management system 20 are illustrated in FIG. 2 in the context of the particular configuration of the chopper 26. In other embodiments, the crop residue management system 20, or other similar systems, can be utilized in the context of choppers or harvesters with different configurations.

In the embodiment illustrated in FIG. 2, the residue management system includes a sensor arrangement 40 that is generally configured to sense indicators of a mass flow rate of crop residue that passes through the chopper 26. In different embodiments, a sensor arrangement can be configured to sense different types of indicators of a mass flow rate of crop residue. In some embodiments, the sensor arrangement 40 can be configured to measure forces on the stationary knife assembly 30 or on a portion of a housing 42 of the chopper 26. For example, as also discussed below, loads on knives of the stationary knife assembly 30, impacts on plates of the housing 42, or strain on the housing 42 can be measured as indicators of mass flow rate of the crop residue stream.

In some embodiments, a sensor arrangement 40a that may be similar to, or part of, the sensor arrangement 40 can be configured to measure indicators of mass flow of crop residue via the rotating knife assembly 28. For example, as also discussed below, loads or impacts on knives of the stationary knife assembly 30, torque or other loading on portions of the rotor of the rotating knife assembly 28, or strain on different components the rotating knife assembly 28 can be measured as indicators of mass flow rate of the crop residue stream.

In some embodiments, indicators of mass flow of crop residue can be measured at multiple locations across a width (e.g., a full width) of the chopper 26 or other system. For example, the sensor arrangement 40 or the sensor arrangement 40a can be configured to measure indicators of mass flow rate of crop residue at one or more central locations, one or more right-side locations, and one or more left-side locations relative to the chopper 26. This may be useful, for example, in order to help determine the relative scale of mass flow rate of crop residue passing through different parts of the chopper 26. Further, in some embodiments, measurements of mass flow rate of crop residue at multiple locations across a chopper can be combined in order to provide an estimate of total mass flow of crop residue through the chopper.

In some embodiments, an electronic processing device can be used in order to analyze data collected by a relevant sensor arrangement. For example, as illustrated in FIG. 2, a processor device 44 with an associated memory 46 can be configured to communicate with the sensor arrangement 40 (or other sensor arrangements). In this way, for example, the processor device 44 can receive signals from the sensor arrangement 40 (or others) corresponding to the measured indicators and, based on the received signals, perform appropriate calculations (e.g., based on previously calibrated correlations) to determine the mass flow rate of the crop residue.

In some embodiments, the processor device 44 can be included in the combine harvester 22, and communication between sensor arrangements and the processor device 44, and between the sensor arrangements and the processor device 44 and various other equipment, may be wired or wireless. Wireless communication for on-board configurations of the processor device 44 can be useful, for example, in order to generally increase reliability, as well as to simplify communication architectures for configurations in which a sensor arrangement is disposed on a rotating component, such as the rotating knife assembly 28. In some embodiments, the processor device 44 can be disposed remotely from the combine harvester 22 and communication with the processor device 44 may be at least partly wireless.

In some embodiments, the memory 46 can be utilized to store data relevant to the analysis of signals from the sensor arrangement 40 or analysis of other relevant data, such as may be entered, for example, via an outside user interface. For example, in some cases, information relating to the type of crop being harvested, the expected (or actual) water content of the crop material, operating states of the combine harvester 22, environmental conditions, or other factors can be used to correlate measurements of impact forces, strain, torque, cutting loads, and so on with actual mass flow rates of the relevant crop residue stream. In this regard, for example, it may sometimes be useful to store look-up tables or other data structures in the memory 46, for use in combination with signals from the sensor arrangement 40, in order to improve the accuracy with which the mass flow rate of crop residue flow streams can be determined. In some implementations, relevant other factors may include, for example, a number of knives installed in stationary or rotating knife assemblies, hours of use on a set of knives or other components, calibration data for various components, and so on.

In different embodiments, a processor device can be configured to determine, in different ways, a distribution of crop residue across a relevant width of a chopper. In some embodiments, the processor device 44 can be configured to determine relative distribution of crop residue flow based on the relative scale (e.g., strength) of the signals received from the sensor arrangement 40. In some embodiments, as also noted above, the measurements represented by the signals can be converted to scalar (e.g., absolute) values of the crop-residue mass flow rate. In some embodiments, scalar values of mass flow rate of crop residue can be combined (e.g., added together, with appropriate weighting) in order to determine a total mass flow or mass flow rate of crop residue across an entire relevant width of the chopper 26.

In some embodiments, the processor device 44 can be configured to calculate an effective center of mass flow of crop residue within a relevant width, based upon the indicators of the mass flow rate of crop residue measured by the plurality of sensors. For example, the processor device 44 can calculate, relative to an origin location (e.g., a center point) along the relative width, a weighted average of measured forces, strain, or other factors. The location of the weighted average relative to the origin can then be provided as a relative indicator of the balance (or imbalance) or uniformity of the mass flow distribution of crop residue across the relevant width.

Figure 3:
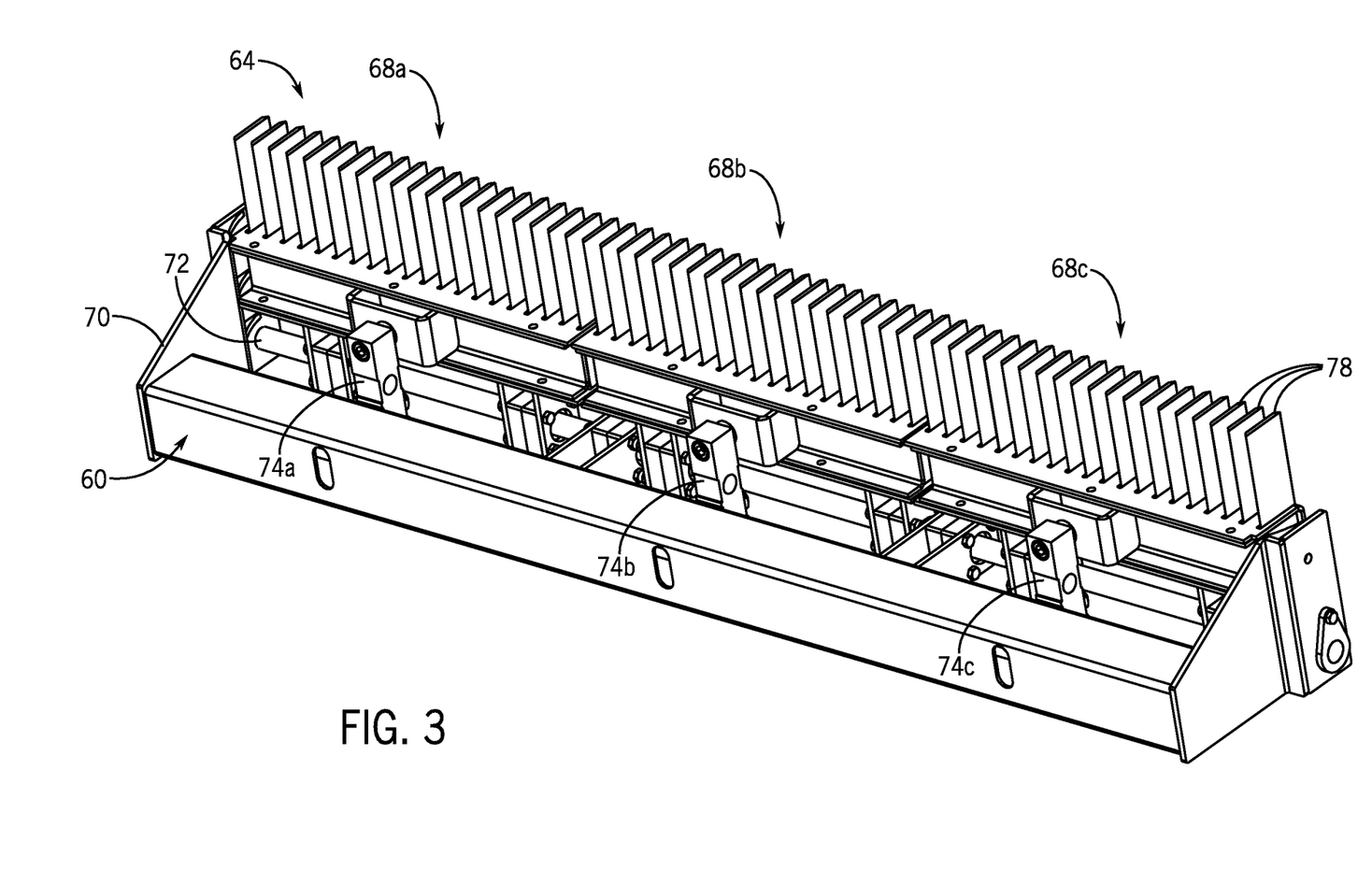
FIG. 3 is an isometric view of a sensor arrangement on a stationary knife bank of a harvester according to an embodiment of the invention.
Figure 4:
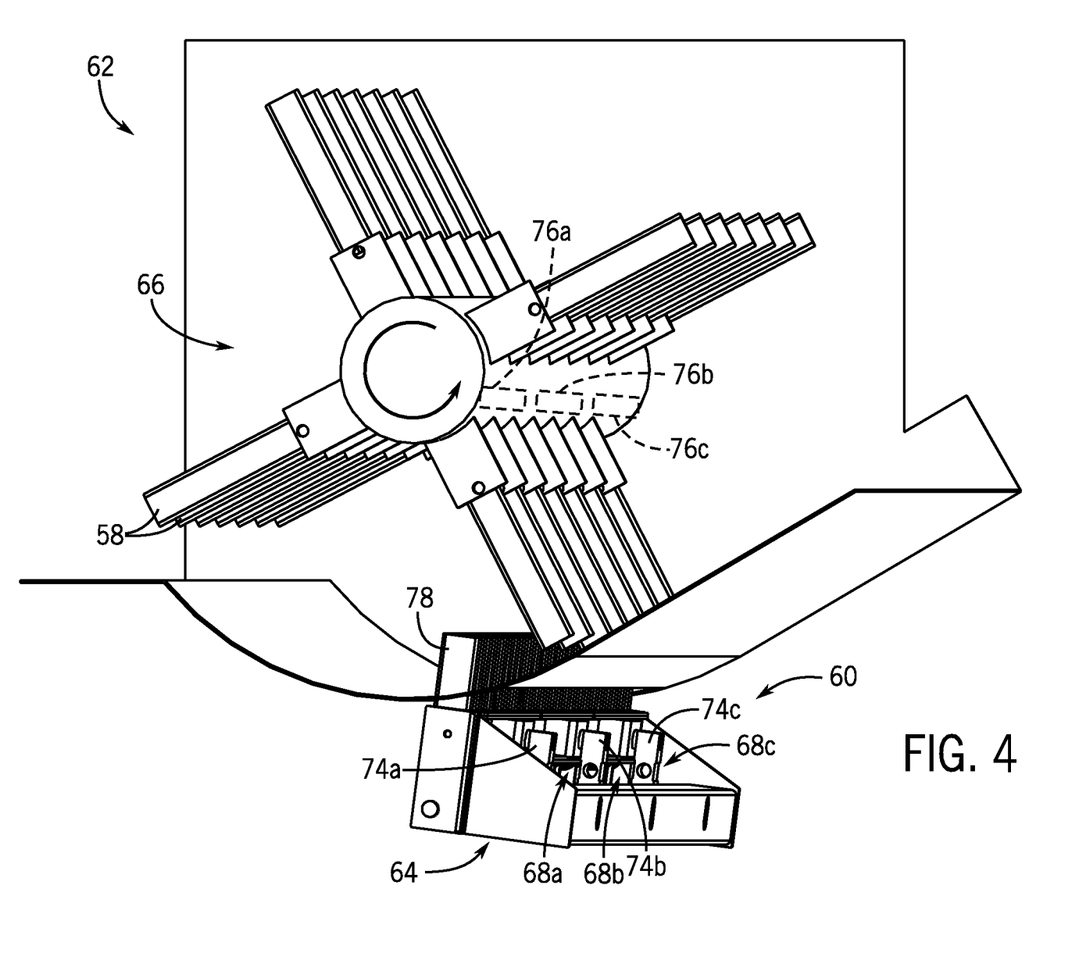
FIG. 4 is an isometric view of the sensor arrangement and the stationary knife bank of FIG. 3 installed in a size-reduction chopper of a harvester according to an embodiment of the invention.

FIGS. 3 and 4 illustrate a residue management system 60 according to an embodiment of the invention, including as installed on a chopper 62 (see FIG. 4). In the embodiment illustrated, the chopper 62 is similar to the chopper 26 (see FIG. 1), with a stationary knife assembly 64 and a rotating knife assembly 66. Accordingly, for example, the residue management system 60 can be used, in some cases, with a combine harvester similar to the combine harvester 22 (see FIG. 1). In other embodiments, other configurations are possible.

In illustrated configuration, a full cutting-width of a knife bank of the stationary knife assembly 64 is divided into three distinct segments 68a, 68b, 68c. Each of the segments 68a, 68b, 68c includes a subset of stationary knife blades 78, is independently supported by a frame 70, and is rotationally linked to the frame 70 by a pivot bar assembly 72. Further, a set of load cells 74a, 74b, 74c is secured to the frame 70, with each of the load cells 74a, 74b, 74c in alignment and operational contact with a respective one of the segments 68a, 68b, 68c.

Thus arranged, the load cells 74a, 74b, 74c are disposed to measure the shear force on the stationary knife blades 78 of the segments 68a, 68b, 68c, respectively. Accordingly, when the stationary knife blades 78 are extended for contact with a stream of crop residue, as illustrated in FIG. 4, the load cells 74a, 74b, 74c can measure the effects of the shear force at the segments 68a, 68b, 68c as an indicator of the mass flow rate of the crop residue past the stationary knife assembly 64. As appropriate, the measured forces can then be further analyzed (e.g., as described above) in order to determine useful information regarding the crop-residue mass flow rate.

In the embodiment illustrated, the particular configuration of the load cells 74a, 74b, 74c may generally maximize a moment arm between force application to the stationary knife blades 78 and the measurement point of the load cells 74a, 74b, 74c. This may be useful, for example, in order to magnify the force on the knife blades as measured by the load cells 74a, 74b, 74c while reducing the effect of vibrations on the relevant measurements. In other embodiments, however, other configurations are possible.

Other variations are also possible. For example, a different number of load cells can be used, with the same or a different number of segments of the stationary knife assembly 64. Similarly, in some embodiments, a different type of sensor can be used to measure forces on the stationary knife assembly 64.

In the embodiment illustrated, the load cells 74a, 74b, 74c and the segments 68a, 68b, 68c are configured to substantially span a full lateral cutting width of the stationary knife assembly 64. This may be useful, for example, in order to provide measurements of crop-residue mass flow rates across the entire operational width of the stationary knife assembly 64, as may be helpful for accurate determination of the distribution of crop-residue mass flow rate within, and of the total mass flow of crop residue through, the chopper 62. In some embodiments, a larger or smaller number of sensors or segments can be used. In some embodiments, sensors may not necessarily be configured to sense loads across a full width of the stationary knife assembly 64. For example, sensors may be configured to measure loads on sets of non-adjacent segments, or segments that do not collectively extend to the outer lateral edges of the stationary knife assembly 64.

In some embodiments, as also noted above, a sensor arrangement can be configured to measure forces on a rotating knife assembly. For example, load cells or other sensors, such as torque sensors 76a, 76b, 76c (see FIG. 4), can be secured to the rotating knife assembly 66 between adjacent segments (not shown) of the rotating knife assembly 66. Mass flow rate of crop residue through the chopper 62 can then be determined, for example, based on measurement of torque between the segments of the rotating knife assembly 66, as may correlate to forces on the knives 58 of the rotating knife assembly 66. In some embodiments, this arrangement can be used in place of, or in combination with, an arrangement in which sensors are configured to measure forces on the stationary knife assembly 64, such as is also illustrated, for example, in FIG. 4.

As another example, in some embodiments, loads on the knives 58 of the rotating knife assembly 66 can be measure relatively directly. For example, instrumented load pins (not shown) can be used to secure one or more of the knives 58 of the rotating knife assembly 66 to the rotor. Or other sensors can be similar positioned. The load pins or other sensors can then be used to measure the shear force at the knives 58 during operation to process crop residue.

In some embodiments, analysis of signals from the load cells 74a, 74b, 74c, the torque sensors 76, or other sensors in a relevant sensor arrangement can be modulated based on environmental or other factors. As noted above, for example, determination of mass flow rate of crop residue can be based in part on information relating to crop type, moisture content, or other factors. Similarly, for example, determination of mass flow rate of crop residue can be based upon how far the stationary knife assembly 64 extends into the crop residue stream, the dullness of the relevant knives (e.g., as estimated based on total operational time and type of crop), or other factors.

In some embodiments, other components can be included. For example, the load cells 74a, 74b, 74c, the torque sensors 76a, 76b, 76c, or other sensors (not shown) can be in communication with a processor device similar to the processor device 44 (see FIG. 2).

Figure 5:
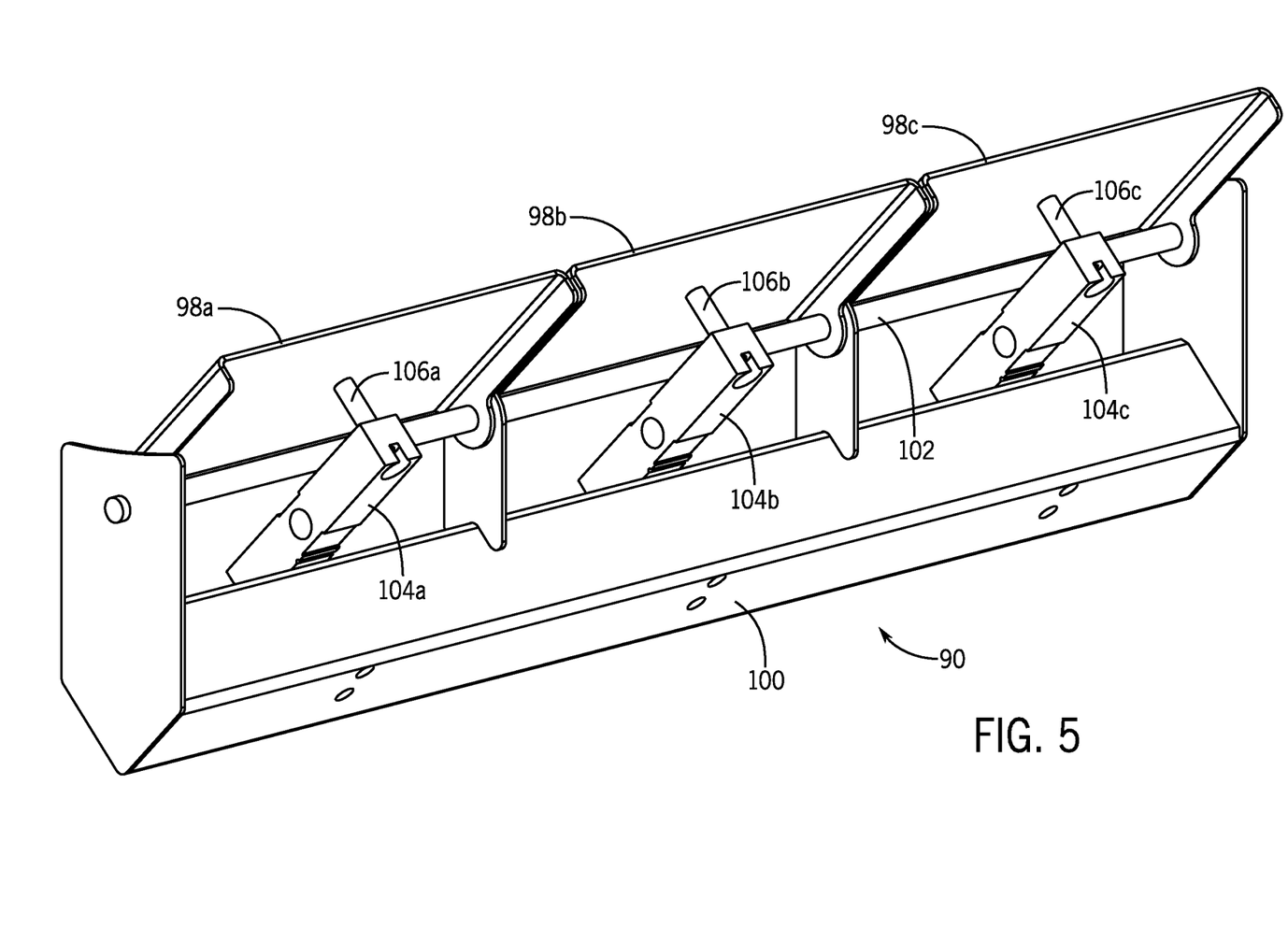
FIG. 5 is an isometric view of an impact sensor arrangement according to an embodiment of the invention.
Figure 6:
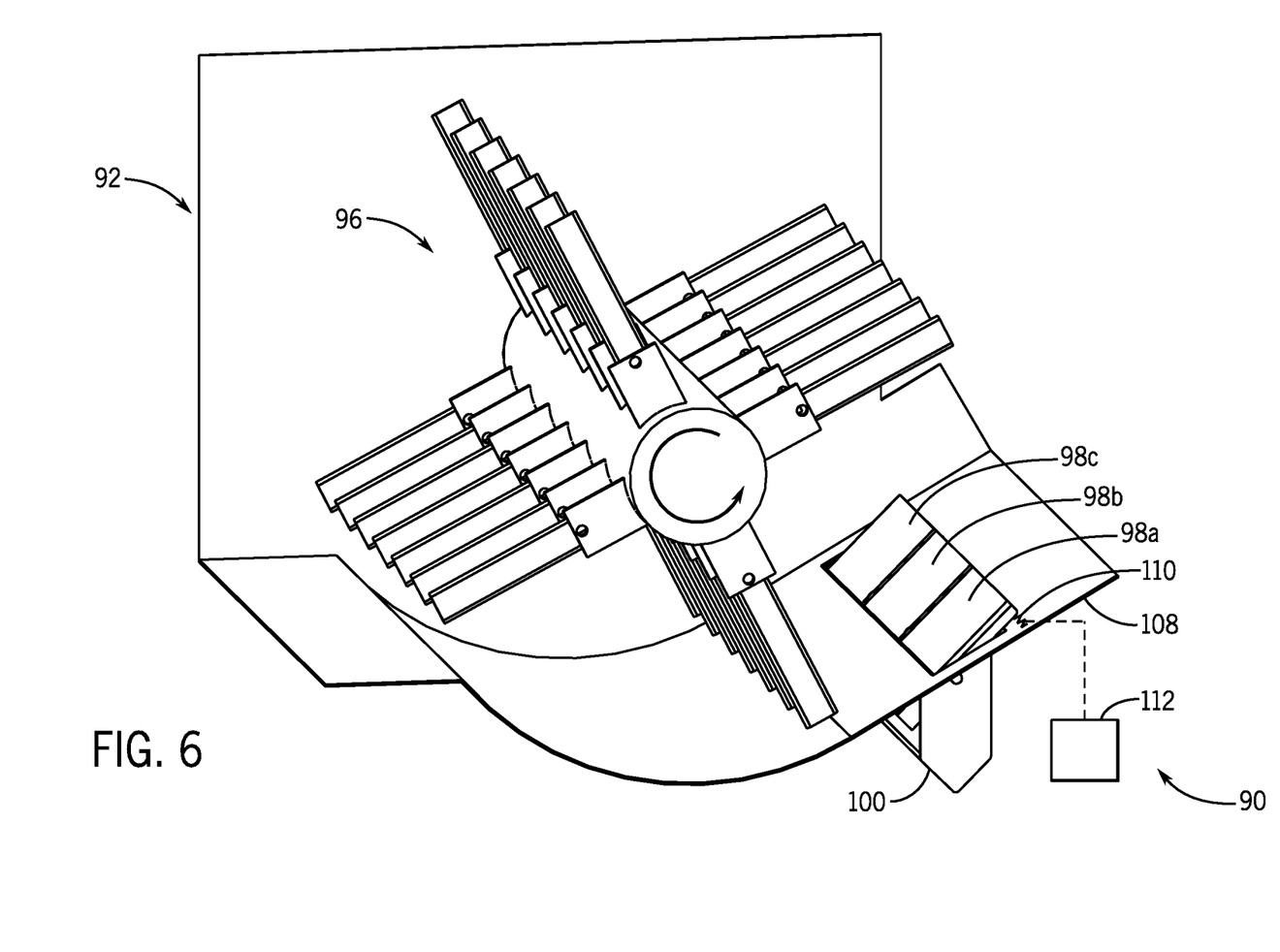
FIG. 6 is an isometric view of the impact sensor arrangement of FIG. 5 installed in a chopper of a harvester according to an embodiment of the invention.

FIGS. 5 and 6 illustrate a crop residue management system 90 according to an embodiment of the invention, including as installed on a chopper 92 (see FIG. 6). In the embodiment illustrated, the chopper 92 is similar to the chopper 26 (see FIG. 1), with a stationary knife assembly (not shown) and a rotating knife assembly 96. Accordingly, for example, the residue management system 90 can be used, in some cases, with a combine harvester similar to the combine harvester 22 (see FIG. 1). In other embodiments, other configurations are possible.

In the illustrated configuration, a set of impact plates 98a, 98b, 98c are independently supported by a frame 100, with each being rotationally linked to the frame 100 by a pivot bar assembly 102. Further, a set of impact sensors 104a, 104b, 104c is secured to the frame 100, each being in alignment and operational contact with a respective one of the impact plates 98a, 98b, 98c.

In some embodiments, the impact plates 98a, 98b, 98c can be supported relative to the frame 100 in other ways. For example, the impact plates 98a, 98b, 98c can be connected to the frame 100 (or another component) via a living hinge or other arrangement instead of, or in addition to, being connected via the pivot bar assembly 102.

In the embodiment illustrated, the impact sensors 104a, 104b, 104c are load cells connected to the associated impact plates 98a, 98b, 98c by rigid force-transmitting pins 106a, 106b, 106c. In other embodiments, other configurations are possible. In some embodiments, force may be transmitted from the impact plates 98a, 98b, 98c to the associated sensor by other connections. In some embodiments, a different type of sensor can be used. For example, in some configurations, a respective spring 110 and a displacement-measuring device 112, as shown schematically in FIG. 6, can be connected to each of the impact plates 98a, 98b, 98c and the displacement-measuring device 112, such as a potentiometer or pressure sensor, can be configured to measure displacement of the springs 110 (or of the impact plates 98a, 98b, 98c). In this way, for example, due to known relationships between force and spring displacement, impact force of the impact plates 98a, 98b, 98c can be measured.

As illustrated in FIG. 6 in particular, the impact plates 98a, 98b, 98c are disposed along a housing 108 of the chopper 92, downstream of the rotating knife assembly 96. As the rotating knife assembly 96 accelerates crop residue rearward within the relevant harvester, different portions of the crop residue may tend to impact a particular one of the impact plates 98a, 98b, 98c, with a location and a force that may depend on the nature of the crop residue, the lateral location of the crop residue within the chopper 92, and the velocity of the crop residue as it leaves the rotating knife assembly 96. Accordingly, with appropriate calibration for particular crop types, operating characteristics, and environmental factors, impact measurements by the impact sensors 104*a*, 104*b*, 104*c* can be correlated with the mass flow rate of crop residue over each the impact plates 98*a*, 98*b*, 98*c*, respectively.

Also as illustrated in FIG. 6 in particular, the impact plates 98*a*, 98*b*, 98*c* angle slightly into the enclosed envelope of the chopper 92, as generally defined by the housing 108. This may be useful, for example, in order to allow for displacement of the impact plates 98*a*, 98*b*, 98*c* upon impact by crop residue, to allow useful impact measurements, without allowing the crop residue to escape through the housing 108 at the impact plates 98*a*, 98*b*, 98*c*. This may also be useful, for example, in order to allow appropriately accurate measurement of crop residue flow rates without deflecting the crop residue sufficiently to significantly adversely affect redistribution of crop residue by other components of the relevant harvester. In some embodiments, an optimization analysis may be undertaken to determine an appropriate angle of a set of impact plates relative to a housing, to obtain appropriate measurement accuracy by associated sensors, along with appropriately small adverse deflection of crop residue by the impact plates. In some embodiments, in contrast to the example illustrated in FIG. 6, impact plates may not necessarily angle or otherwise extend into an enclosed envelope of a chopper.

In the embodiment illustrated, the impact plates 98*a*, 98*b*, 98*c* substantially span a full lateral width of the chopper 92. This may be useful, for example, in order to provide measurements of crop-residue mass flow rates across the entire chopper 92, in order to more accurately determine of uniformity of flow rate and of total mass flow of crop residue through the chopper 92. In some embodiments, a larger or smaller number of impact plates can be used. In some embodiments, impact plates may not necessarily span a full width of a chopper or other system. For example, significant spacing may be provided between adjacent impact plates, or between impact plates and lateral boundaries of a relevant enclosure.

In some embodiments, an impact-plate arrangement similar to that illustrated in FIGS. 5 and 6 can be located elsewhere in a relevant harvester. For example, an arrangement similar to that illustrated for the impact plates 98*a*, 98*b*, 98*c* can be disposed at an inlet of a distribution tailboard (not shown in FIGS. 5 and 6) or at other locations in a residue processing system of the harvester (including a header). Depending on the particular location, such an arrangement may still allow measurement of crop-residue mass flow rates through a relevant chopper, although the arrangement may not necessarily be disposed within the chopper.

In some embodiments, analysis of signals from the impact sensors 104*a*, 104*b*, 104*c* or other sensors in a relevant impact sensing arrangement can be modulated based on environmental or other factors. As noted above, for example, determination of mass flow rate of crop residue can be based in part on information relating to crop type or moisture content. Similarly, for example, determination of mass flow rate of crop residue can be based upon how far a particular impact plate extends into the crop residue stream, the size or stiffness of the impact plate or associated structures, or other factors, such as chopper rotational speed.

In some embodiments, other components can be included. For example, the impact sensors 104*a*, 104*b*, 104*c* or other sensors (not shown) can be in communication with a processor device similar to the processor device 44 (see FIG. 2).

Figure 7:
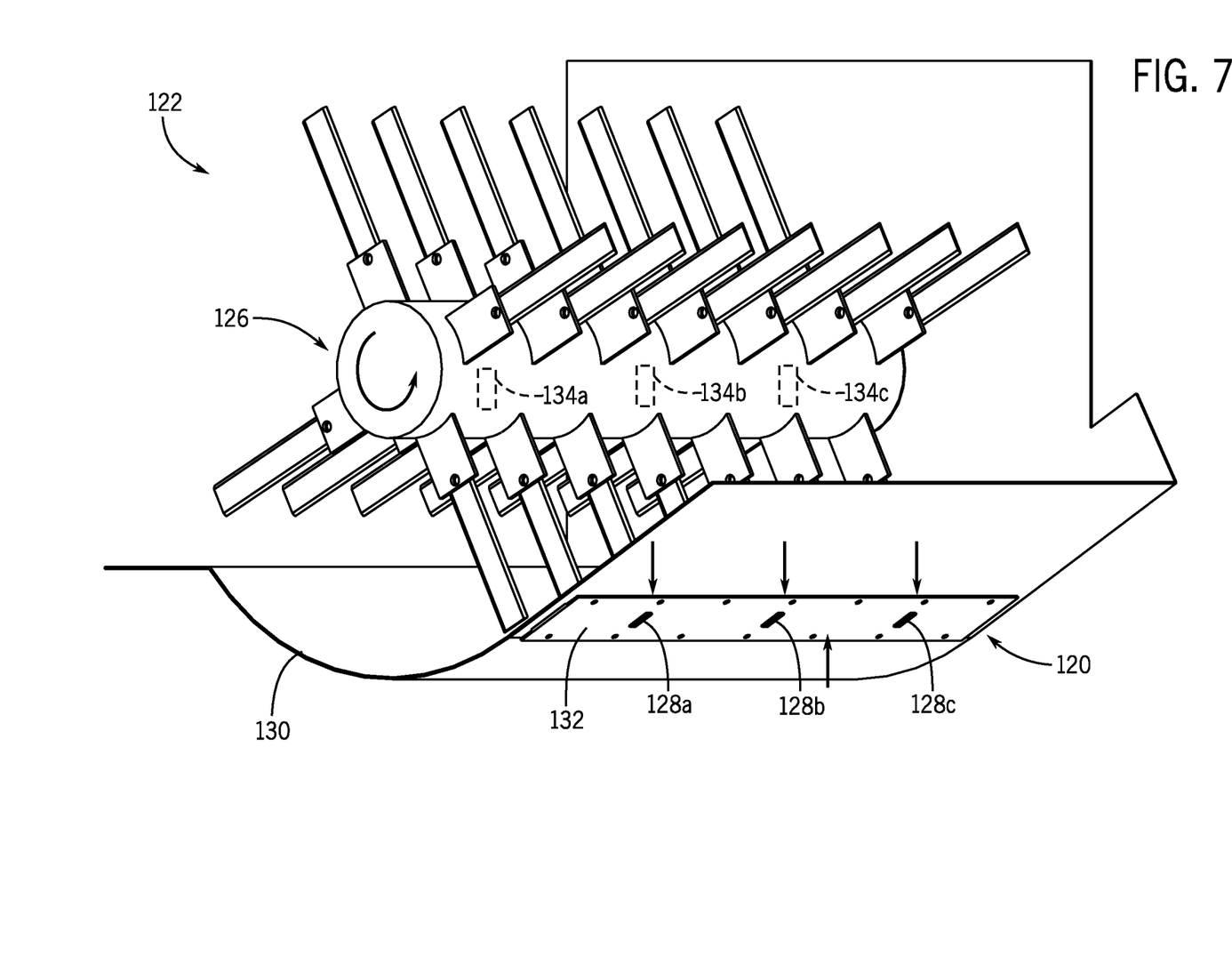
FIGS. 7 and 8 are isometric views of a size-reduction chopper of a harvester with a strain sensor arrangement according to an embodiment of the invention.
Figure 8:
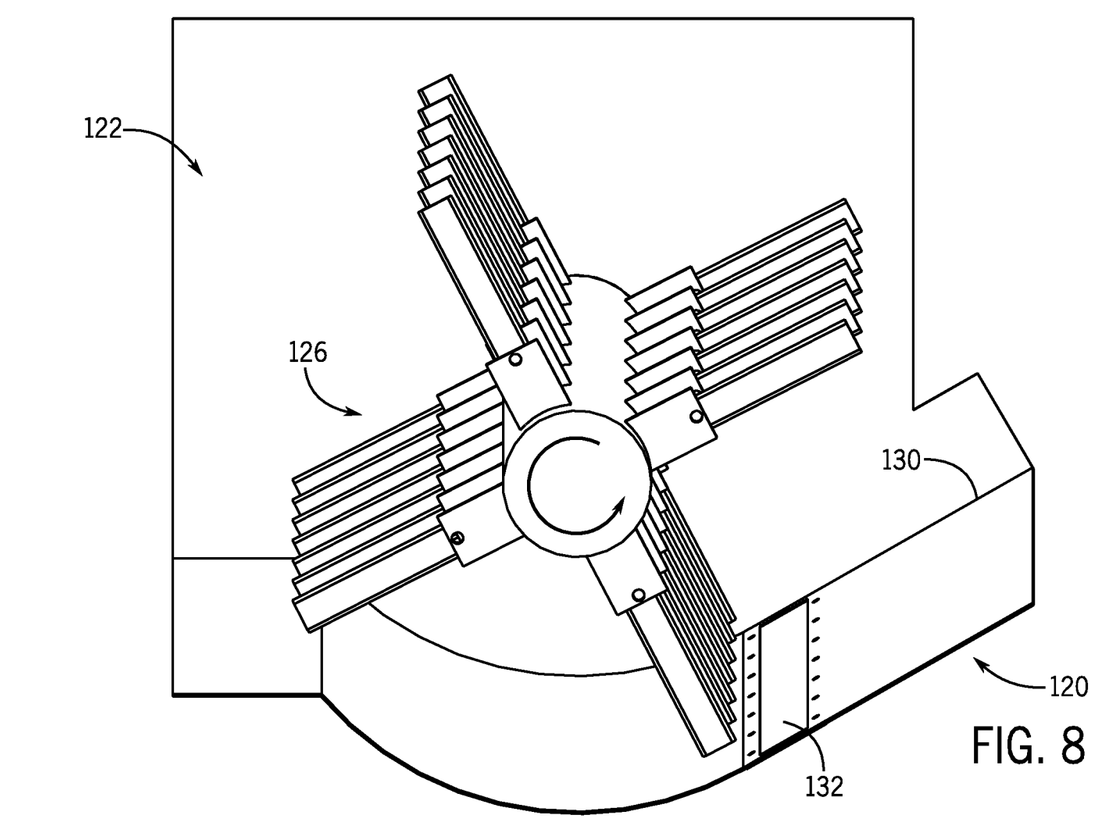

FIGS. 7 and 8 illustrate a crop residue management system 120 according to an embodiment of the invention, as installed on a chopper 122. In the embodiment illustrated, the chopper 122 is similar to the chopper 26 (see FIG. 1), with a stationary knife assembly (not shown) and a rotating knife assembly 126. Accordingly, for example, the residue management system 90 can be used, in some cases, with a combine harvester similar to the combine harvester 22 (see FIG. 1). In other embodiments, other configurations are possible.

In the illustrated configuration, a set of strain gauges 128*a*, 128*b*, 128*c* are arranged along a width of a housing 130 of the chopper 122, downstream of the rotating knife assembly 126. As the rotating knife assembly 126 accelerates crop residue rearward within the relevant harvester, the crop residue may tend to impact the housing 130 more closely to a particular one of the strain gauges 128*a*, 128*b*, 128*c*. The crop residue can thereby generate a reaction force in the housing 130, with a location and a magnitude that may depend on the nature of the crop residue, the lateral location of the crop residue within the chopper 122, and the velocity of the crop residue as it leaves the rotating knife assembly 126. Accordingly, with appropriate calibration for particular crop types, operating and structural characteristics, and environmental factors, measurement of local strain on the housing 130, as obtained by the strain gauges 128*a*, 128*b*, 128*c*, can be correlated with a local (or other) mass flow rate of crop residue within the housing 130.

In the embodiment illustrated, the strain gauges 128*a*, 128*b*. 128*c* are secured to the housing 130 via a precision-machined strain plate 132 that has been installed in place of a portion of the usual (e.g., original) sheet metal of the housing 130. This may be useful, for example, in order to appropriately isolate regions of strain measurement from vibrational noise or other interference originating in, or transmitted through, other portions of the housing 130. In some embodiments, however, the strain gauges 128*a*, 128*b*, 128*c* can be directly secured to uninterrupted panels of the housing 130, or in other locations in a residue processing system. In some embodiments, strain gauges can be secured to the rotating knife assembly 126, such as illustrated by strain gauges 134*a*, 134*b*, 134*c* to measure strain on the rotating knife assembly 126 during operation.

In the embodiment illustrated, the strain plate 132 substantially spans a full lateral width of the chopper 122. This may be useful, for example, in order to provide measurements of crop-residue mass flow rates across the entire chopper 122, to help accurately determine a distribution of flow rate of crop residue, and of total mass flow of crop residue, through the chopper 122. In some embodiments, a strain plate or other mounting arrangement of larger or smaller width can be used. In some embodiments, a strain plate or other component to which strain gauges are mounted may not necessarily span a full width of a chopper or other system. For example, significant spacing may be provided between adjacent strain plates, or between one or more strain plates and the lateral boundaries of a relevant enclosure.

In some embodiments, a strain-gauge arrangement similar to that illustrated in FIGS. 7 and 8 can be located elsewhere in a relevant harvester. For example, an arrangement similar to that illustrated for the strain gauges 128*a*, 128*b*, 128*c* can be disposed at an inlet of a distribution tailboard (not shown in FIGS. 7 and 8) or at other locations in a residue processing system. Depending on the particular location, such an arrangement may still allow measurement of crop-residue mass flow rates through a relevant chopper, although the arrangement may not necessarily be disposed within the chopper.

In some embodiments, analysis of signals from the strain gauges 128*a*, 128*b*, 128*c* or other sensors in a relevant strain sensing arrangement can be modulated based on environmental or other factors. As noted above, for example, determination of mass flow rate of crop residue can be based in part on information relating to crop type or moisture content. Similarly, for example, determination of mass flow rate of crop residue can be based upon characteristics relating to how a particular strain plate configuration, or other component, responds to particular types of impacts, or other factors.

In some embodiments, other components can be included. For example, the strain gauges 128*a*, 128*b*, 128*c* or other sensors (not shown) can be in communication with a processor device similar to the processor device 44 (see FIG. 2).

In some embodiments, including relatively close variations of those expressly discussed above, different types of sensors can be used. For example, in some embodiments, a mechanical component at which force is to be measured can be linked with a piston that extends within a fluid-filled cylinder. Further, one or more sensors can be disposed to measure the pressure of the fluid within the cylinder. By measuring pressure of the fluid, force applied to the piston can be determined and, thereby, relevant forces imparted by crop residue moving through a harvester. As another example, speed sensors on a rotating knife assembly or other moving component can be configured to measure indicators of impact energy, or position sensors on a stationary knife assembly or other component can be configured to measure other relevant indicators.

Figure 9:
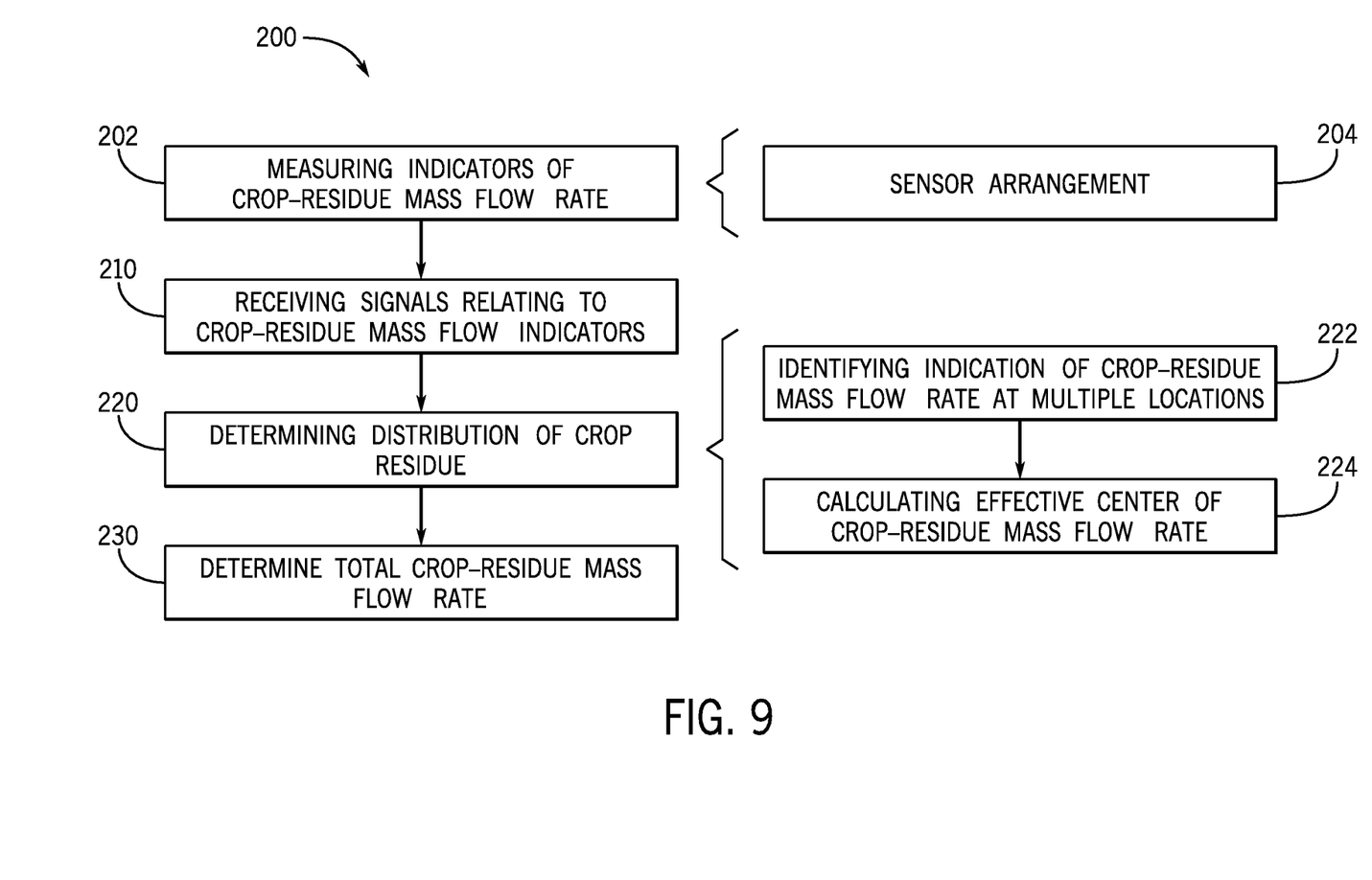
FIG. 9 is a schematic representation of a method of managing crop residue according to an embodiment of the invention.

Some embodiments of the invention can include methods of monitoring crop residue within a harvester, including via computer-implemented operations. FIG. 9 illustrates an example method 200 according to the invention. In some implementations, the method 200 (or aspects thereof) can be implemented with respect to arrangements expressly discussed above. In some implementations, the method 200 can be used with other arrangements, or the arrangements expressly discussed above can be operated using different methods.

In the embodiment illustrated, the method 200 includes measuring 202 indicators of a mass flow rate of the crop residue through the chopper. In some implementations, measurement 202 can be effected using a sensor arrangement 204, such as an arrangement of load cells, strain gauges, torque sensors, impact sensors, or other sensors, which may be configured to relay sensor data to a processor device.

Once the relevant indicators have been measured 202, signals corresponding to the measurements can be received. For example, a processor device within a central control unit of a harvester, a sensor package, or a remote (e.g., cloud-enabled) control system can receive 210 signals from a sensor (or sensors) that are indicative of the force or other indicator measured 202 by the sensor arrangement 204.

Having received 210 appropriate signals, a processor device can then determine 220 a distribution of crop residue within a relevant area. In some embodiments, as discussed above, crop residue distribution can be determined within a chopper based upon sensor data gathered within the chopper. In some embodiments, sensor data can be gathered at other locations within a residue processing system, such that the data may not necessarily directly indicate crop residue mass flow within a chopper, although the data may still generally correspond to crop residue mass flow that passes through the chopper.

In some embodiments, determining 220 a distribution of crop residue may include first identifying 222 indicators of mass flow of crop residue at multiple locations and then calculating 224 an effective center of a mass flow rate of crop residue based upon the identified 222 mass flow of crop residue. For example, weight averages of absolute or relative mass flow of crop residue across a width (e.g., a full width) of a chopper can be determined, with a larger or smaller number generally corresponding to a bias of the mass flow rate of crop residue towards a particular region of the chopper. Thus, for example, determining 220 a distribution of crop residue can include calculating 224 an indicator of the lateral distribution or general uniformity of the mass flow.

In some embodiments, a total mass flow rate of crop residue can be determined 230. For example, with appropriate calibration, measured 202 indicators of mass flow rate of crop residue can be correlated to absolute mass flow rates of crop residue, as opposed to relative mass flow rates of crop residue measured comparatively between different regions of a harvester. As also noted above, in some cases, appropriate calibration may depend upon factors including crop type, moisture content, operational parameters of the relevant harvester, other environmental factors, and so on.

As also discussed above, in some embodiments, sensor arrangements can be configured to measure indicators of mass flow of crop residue at different parts of a residue processing system. For example, sensor arrangements can be configured to measure indicators of mass flow rate of crop residue at a chopper or a downstream component, such as tailboard spreader. In some embodiments, sensor arrangements can be configured to measure indicators of mass flow rate of crop residue within a residue processing system upstream of a chopper.

Thus, embodiments of the invention can provide improved systems and methods for monitoring flow of crop residue through harvesters. This may be useful, for example, in order to improve erosion protection, prevent plugging of tillage or seeding equipment, improve stand establishment, ensure uniform germination, and support no-till and direct seeding practices. Further, maintaining crop residue on a field, particularly with appropriately uniform distribution, can offer significant benefits over alternatives, such as baling or tilling, including better snow catch and water infiltration, reduced moisture evaporation, increased soil organic matter content, improved soil structure and plant nutrient cycling, and lower overall costs of production.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

What is claimed is:

1. A residue management system for an agricultural harvester, the agricultural harvester including a chopper with a knife assembly for reducing size of crop residue, the residue management system comprising:

a sensor arrangement in communication with one or more components of the chopper, the sensor arrangement including a plurality of sensors arranged on a stationary knife assembly of the knife assembly of the chopper to measure indicators of a mass flow rate of the crop residue through the chopper across a width of a stream of the crop residue, based on measuring forces of the crop residue on the stationary knife assembly.

2. The residue management system of claim 1, wherein the plurality of sensors are distributed across a width of the chopper along the stationary knife assembly to measure indicators of the mass flow rate at different locations across the width of the chopper.

3. The residue management system of claim 2, further comprising:
   a processor device in communication with the sensor arrangement;
   wherein the processor device is configured to:
      receive signals corresponding to the indicators of the mass flow rate measured by the plurality of sensors; and
      determine a distribution of the crop residue across the width of the chopper based upon the indicators of the mass flow rate.

4. The residue management system of claim 3, wherein determining the distribution of the crop residue across the width of the chopper includes:
   calculating an effective center of mass flow of the crop residue within the width of the chopper based upon the indicators of the mass flow rate measured by the plurality of sensors.

5. The residue management system of claim 1, wherein the plurality of sensors arranged on the stationary knife assembly are associated with a plurality of knives of the stationary knife assembly.

6. The residue management system of claim 5, wherein the plurality of sensors arranged on the stationary knife assembly includes a plurality of load cells associated with the plurality of knives of the stationary knife assembly.

7. The residue management system of claim 1, wherein the knife assembly further includes a rotating knife assembly.

8. The residue management system of claim 7, wherein the sensor arrangement further includes a plurality of torque sensors distributed across a width of the rotating knife assembly.

9. The residue management system of claim 1, further comprising:
   one or more impact plates that extend at least partly into a flow path of the crop residue,
   wherein the sensor arrangement is further configured to measure impact forces of the crop residue on the one or more impact plates as further indicators of the mass flow rate.

10. The residue management system of claim 9, wherein the sensor arrangement further includes one or more springs coupled to the one or more impact plates and one or more displacement-measuring devices configured to measure displacement of the one or more springs.

11. The residue management system of claim 1, wherein the sensor arrangement further includes one or more strain gauges configured to measure strain caused by movement of the crop residue through the chopper.

12. The residue management system of claim 11, with the chopper including a housing, wherein the one or more strain gauges are configured to measure strain on the housing caused by the crop residue.

13. An agricultural harvester comprising:
   a header configured to harvest crop material;
   a residue processing system to process crop residue that is separated from the harvested crop material; and
   a residue management system that includes a sensor arrangement in communication with one or more components of the residue processing system,
   the sensor arrangement being configured to measure indicators of a mass flow rate of the crop residue through the residue processing system,
   the sensor arrangement including a plurality of sensors distributed across a width of the residue processing system to measure impact forces of the crop residue, on a plurality of impact plates that extend at least partly into a flow path of the crop residue, as indicators of the mass flow rate at different locations across the width of the residue processing system, and
   the plurality of sensors including a plurality of impact sensors configured as a plurality of load cells connected with the plurality of impact plates by rigid force-transmitting pins to measure the impact forces.

14. The agricultural harvester of claim 13, further comprising:
   a processor device in communication with the sensor arrangement;
   wherein the processor device is configured to:
      receive signals corresponding to the indicators of the mass flow rate measured by the plurality of sensors; and
      determine a distribution of the crop residue across the width of the residue processing system.

15. The agricultural harvester of claim 14, wherein the processor device is further configured to determine a total mass flow rate of the crop residue through the residue processing system.

16. The agricultural harvester of claim 13, wherein the residue management system includes a chopper with a knife assembly; and
   wherein the sensor arrangement further includes a plurality of strain gauges configured to measure forces on the knife assembly from the crop residue.

17. The agricultural harvester of claim 16, wherein the knife assembly includes a rotating knife assembly, and
   wherein the plurality of strain gauges are arranged on the rotating knife assembly.

18. A method of managing crop residue for an agricultural harvester using one or more processor devices, the agricultural harvester including a chopper with a knife assembly for reducing size of the crop residue, and a sensor arrangement in communication with the chopper, the method comprising:
   measuring, using the sensor arrangement, indicators of a mass flow rate of the crop residue through the chopper;
   determining, using the one or more processor devices, based upon the indicators of the mass flow rate, one or more of:
      a distribution of the crop residue within the chopper; or
      a total mass flow rate of the crop residue through the chopper,
   wherein the knife assembly of the chopper includes a stationary knife assembly, and the sensor arrangement includes a plurality of sensors arranged on the stationary knife assembly.

19. The method of claim 18, further comprising:
   determining the total mass flow rate based upon determining the distribution of the crop residue.

20. The method of claim 18, wherein determining the distribution of the crop residue within the chopper includes:

identifying, using the one or more processor devices, an indicator of the mass flow rate of the crop residue at each of multiple locations along the stationary knife assembly within the chopper; and calculating, using the one or more processor devices, an effective center of the mass flow rate within the chopper, based upon the indicator of the mass flow rate of the crop residue at each of multiple locations along the stationary knife assembly within the chopper.

\* \* \* \* \*